UNITED STATES PATENT OFFICE.

HENRI RAYMOND VIDAL, OF PARIS, FRANCE.

PROCESS OF OBTAINING DYES FROM SULFANILIC ACID.

SPECIFICATION forming part of Letters Patent No. 601,364, dated March 29, 1898.

Application filed July 24, 1897. Serial No. 645,861. (Specimens.) Patented in France March 10, 1897, No. 264,867, and in England March 13, 1897, No. 6,694.

*To all whom it may concern:*

Be it known that I, HENRI RAYMOND VIDAL, of Paris, France, have invented certain new and useful Improvements in Coloring-Matters, (for which I have obtained patents in France, No. 264,867, dated March 10, 1897, and in Great Britain, No. 6,694, dated March 13, 1897,) which are fully described in the following specification.

By causing paramidophenol to act upon parasulfanilic acid I have obtained a new blue coloring-matter.

Example: I heat upon a bath of oil at about 170° in an iron pot provided with an agitating device parasulfanilic acid, 17.300 kilograms, and paramidophenol, eleven kilograms. The mass is liquefied, and I obtain, finally, in from two to three hours' boiling a very hard bluish-black mass, which by stopping the agitating device indicates that the reaction is terminated. The coloring-matter thus obtained dyes directly cotton in an alkaline bath in very rich blue tints. In this reaction I may, with a view to obtaining analogous bodies, replace the parasulfanilic acid by naphthionic acid or metasulfanilic acid.

If I replace the paramidophenol by its isomeric orthoamidophenol, I obtain a reddish-blue coloring-matter.

Example: I heat, as in the first example, parasulfanilic acid, 17.300 kilograms, and orthoamidophenol, eleven kilograms. I obtain a reddish-blue mass soluble into black in alkalies and dyeing directly cotton.

The substitutions of metamidophenol for the orthoamidophenol gives a yellowish-blue coloring-matter.

I may also replace the paramidophenol by amidonaphthol alpha$_1$ alpha$_2$.

If in the reaction of the first example I replace the eleven kilograms of paramidophenol by the same quantity of paraphenylenediamin, I obtain a violet coloring-matter soluble in acids. In this reaction I add a certain quantity of glycerin to form a pasty mass, the mixture of parasulfanilic acid and paraphenylenediamin being scarcely fusible. I may also replace the paraphenylenediamin by naphthenediamin alpha$_1$ alpha$_2$.

In the foregoing reactions metasulfanilic acid is an equivalent of parasulfanilic acid, as is also the analogue of the naphthalene series—*i. e.*, naphthionic acid. While it is my purpose to claim in this application the new process broadly, including the variations described, I have made an application, filed December 28, 1897, Serial No. 664,084, as a division hereof, covering specifically the reaction of sulfanilic acid (or its equivalents) upon certain diamins of the naphthalene and benzene series.

Having now particularly described and ascertained the nature of my said invention and in what manner the same is to be performed, I declare that what I claim is—

The process of making coloring-matters by heating an amidophenol with parasulfanilic acid, substantially as described.

In testimony whereof I have signed this specification in the presence of two subscribing witnesses.

HENRI RAYMOND VIDAL.

Witnesses:
EDWARD P. MACLEAN,
ANTOINE RIEUNANNA.